June 18, 1968    D. G. COLEMAN ET AL    3,388,851

EGG CARTON

Filed April 5, 1967    3 Sheets-Sheet 1

INVENTORS
D.G. COLEMAN
C.E. HOOK

BY Roy A. Plant

ATTORNEY

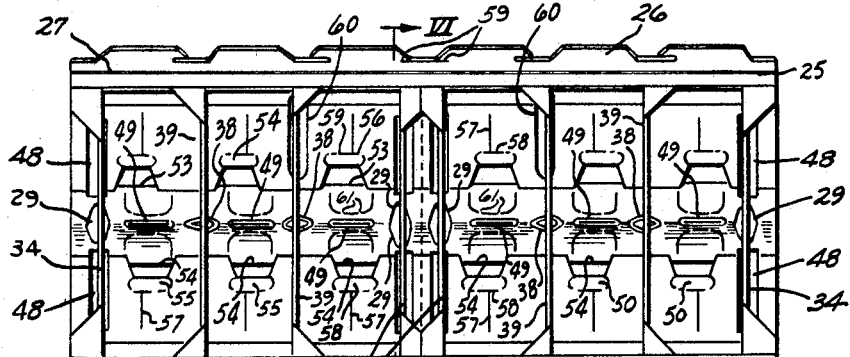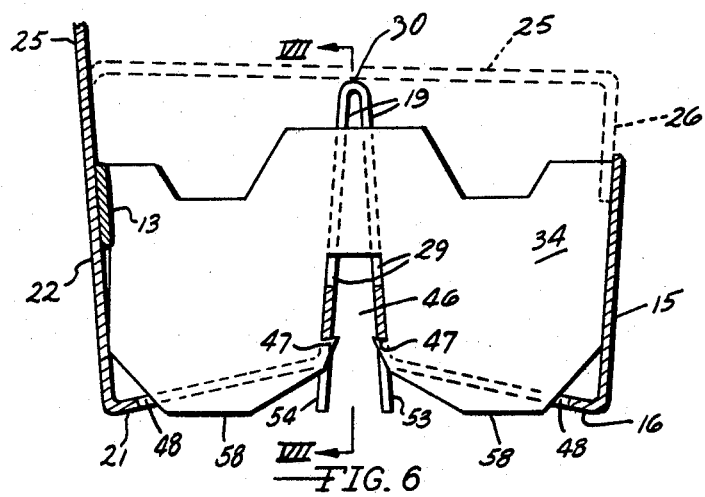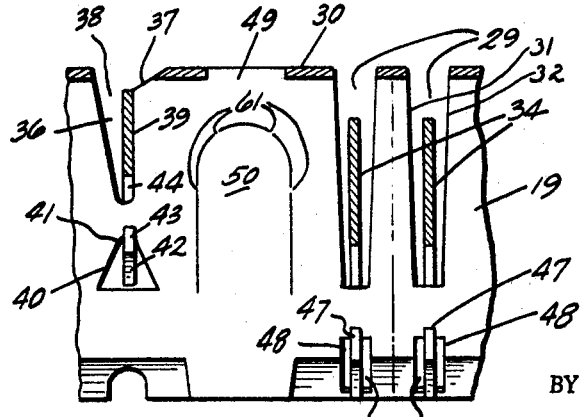

# 3,388,851
EGG CARTON

Donald G. Coleman and Charles E. Hook, Battle Creek, Mich., assignors to Michigan Carton Co., Battle Creek, Mich., a corporation of Michigan
Filed Apr. 5, 1967, Ser. No. 628,656
18 Claims. (Cl. 229—29)

ABSTRACT OF THE DISCLOSURE

The present invention involves a paperboard type of inverted V-shaped center partition egg carton improved to reduce egg breakage, supply extra egg space, and facilitate ease of setting up in a set-up machine such as covered by U.S. Patent No. 3,205,793, with such improvements residing in providing a new type cathedral in the form of a bottom hinged tongue in the center partition for each egg compartment; and a hinged member in the bottom of each egg compartment for ready freeing the bottom of the two rows of center supporting feet extending downward from the sides of the inverted V-shaped center partition so that said feet do not become bent out of the plane of said sides so as to reduce their supporting ability. Offsetting said tongue shape cathedrals on opposite sides of said inverted V-shaped central partition vertically relative to each other, and said two rows of feet lengthwise of said carton relative to each other to minimize catching on each other while the carton is being set up. Said hinged members in the bottom of each egg receiving compartment each being hinged on two spaced apart nicks on the side of same remote from that initially in contact with the bottom of said feet, an egg cushioning slit in the bottom of each egg receiving compartment, said slit extending from the side of said hinged member, between said nicks, substantially to the adjacent outer side of said egg carton bottom to facilitate cushioning the bottom of an egg while holding it against dangerous settling if the egg carton were dropped and which would allow the egg to be more easily broken.

---

This invention relates broadly to paperboard containers, and more specifically to an improved egg carton especially adapted for handling extra large eggs.

Eggs are commonly packed in dozen size egg cartons formed from carton board, which egg-filled cartons, ready for transportation to grocery stores and the like, are commonly stacked all in the same direction, in wire crates or baskets five cartons high. It thus will be apparent that if the so-packed wire crate or basket is dropped in the course of handling, this will put excessive pressure on the bottom egg cartons due to the weight of the egg-filled cartons resting on same. To aggravate this the paperboard egg cartons are universally made narrower at their bottom than at their top with the bottom side edges of the carton resting inward of the side edges of the top panel of a next lower egg carton when stacked in the same direction (not crosswise of each other), which with a low center ridge or an inadequately supporting center ridge for the egg carton cover, allows the cover to depress when a wire crate filled with egg cartons is accidentally dropped, with resultant breaking of eggs to commonly occur, and especially in connection with those eggs which are a little longer than usual. Another problem in the paperboard egg carton art is that the width of the cartons is substantially standardized so that they will fit in the standard size wire crates in which the filled egg cartons are shipped to the customer. This causes trouble with the extra large eggs since room for two eggs opposite each other crosswise of the egg carton is at a premium, and it is necessary to take advantage of every possible source of space which can be found. Another difficulty is to find space in the inverted V-ridge portion of the set-up carton to allow the eggs to extend into this space at least to a limited extent, and which is commonly done by means of the conventionally used cathedral cutting of the ridge portion of the carton which involves a straight up and down cut with several straight cross slits to allow the side of the egg to be cushioned by same. This type of cathedral is only partially satisfactory since it is too stiff, does not readily allow the egg contacting same to promptly settle back into the cathedral for proper cushioning, and the backwardly extending cathedral tongues conflict with the cathedral tongues of the opposite egg compartment so as to reduce the space in the inverted V-shaped ridge member for the reception of the sides of extra large eggs. In our co-pending patent application filed June 1, 1965, Ser. No. 460,378, now Patent No. 3,351,-262 we have described and claimed a different and completely new form of cathedral which has deeply downturned and deeply upturned top and bottom cross cuts which provide shorter hinge lines for the side members of the cathedral so that the egg settles into the cathedral readily and thus immediately cushions and cradles the egg to resist breakage, but does not permit, any more than the other cathedrals, maximum use of the space in the center ridge portion of the carton to provide more room for the extra large eggs which will not properly fit in a conventional carton for the common eggs of standard size. Another problem is that with the common egg cartons with two rows of bottom supporting feet between the side edges of the carton bottom, these cartons resist, while being set up, springing of the feet out to supporting position when passing through a carton set-up machine. It was a recognition of these problems, as well as others, and the need of an improved paperboard carton, commercially acceptable, and less subject to these difficulties as well as providing more space for extra large eggs, and better resistance to breakage of extra large eggs under the conditions noted which led to the conception and development of the present invention.

Accordingly, among the objects of the present invention is the provision of a paperboard egg carton of improved construction adapting it for the more satisfactory handling of extra large eggs.

Another object is to provide single tongue type cathedral members in the sides of the carton inverted V-shaped ridge member.

Another object is to partially slit the top of the carton ridge member above the single tongue type cathedral members.

Another object is to provide an egg carton with foot members cut out of the carton bottom and with hinged members adjacent the bottom of each foot member to facilitate moving the foot members to proper position when the carton is being set up.

A further object is to slit the bottom of each egg receiving cell from the hinged edge of said hinged member toward the side of the carton bottom starting between a pair of wide nicks which hingedly mount said hinged member to said carton bottom, to thus provide cushioning support for the bottom of the egg while at the same time supplying support for said egg.

A further object is to provide the single tongue cathedral members with several weak narrow nicks to hold them in place while the carton blank is being printed and/or set up in an egg carton set-up machine.

A further object is to provide an egg carton of the type herein disclosed with the opposite tongue-like cathedral members offset slightly vertically from each other, and with the feet on opposite sides of the carton bottom being moderately offset from each other lengthwise of the carton, said offsetting minimizing the possibility of one carton blank hooking into the adjacent carton blank during the start of setting up of the carton blank ready for filling with eggs.

Still further objects and advantages of the invention will appear as the description proceeds.

To the accomplishment of the foregoing and related ends, the invention, then, consists of the carton means hereinafter fully described and particularly pointed out in the claims, the annexed drawings and the following description setting forth in detail certain illustrative embodiments of the egg carton of the present invention, such disclosed embodiments illustrating, however, but one of the various ways in which the principle of the invention may be used.

In the annexed drawings:

FIGURE 4 is an end view of the egg carton blank in prefolded and glued form as seen along line IV—IV of FIGURE 1, looking in the direction of the arrows.

FIGURE 5 is a top view of the set-up egg carton shown in FIGURE 2.

FIGURE 6 is an enlarged sectional view of the egg carton of the present invention as taken along line VI—VI of FIGURE 5, looking in the direction of the arrows, with the phantom lines showing the carton cover panel in closed position, and with the bottom and ridge in set-up position behind one of the tall cross partitions in the central portion of the carton.

FIGURE 7 is an enlarged fragmentary sectional view as taken along the line VII—VII of FIGURE 6, looking in the direction of the arrows.

Figure 1:
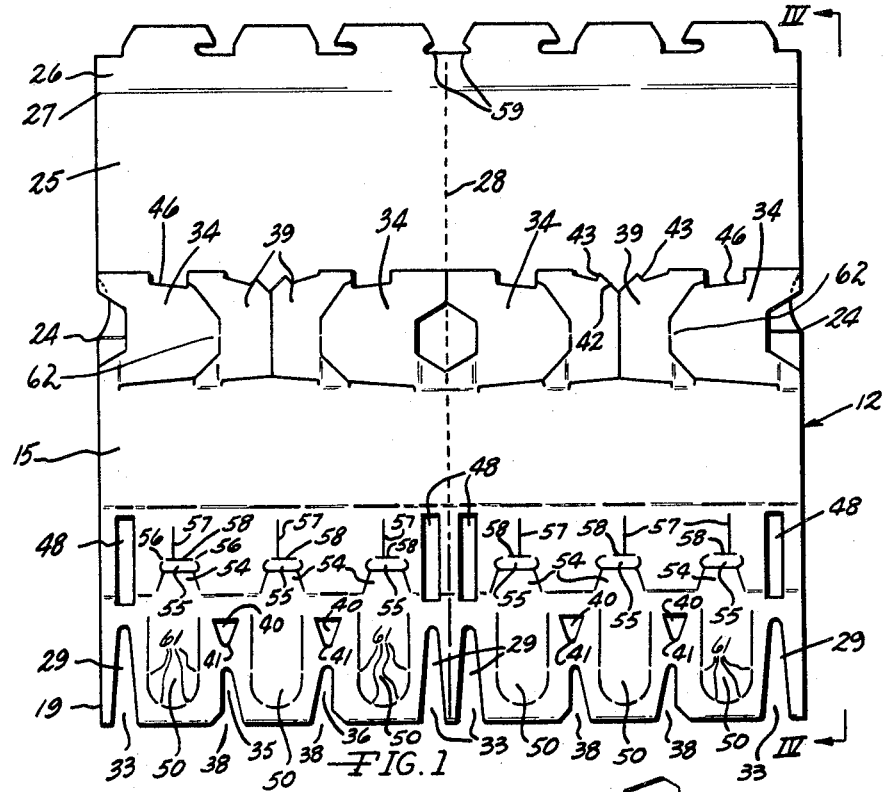
FIGURE 1 shows a blank for producing the egg carton of the present invention, such blank being prefolded and glued ready for setting up in finished egg carton form, as shown in FIGURE 2, ready for filling with eggs.
Figure 2:
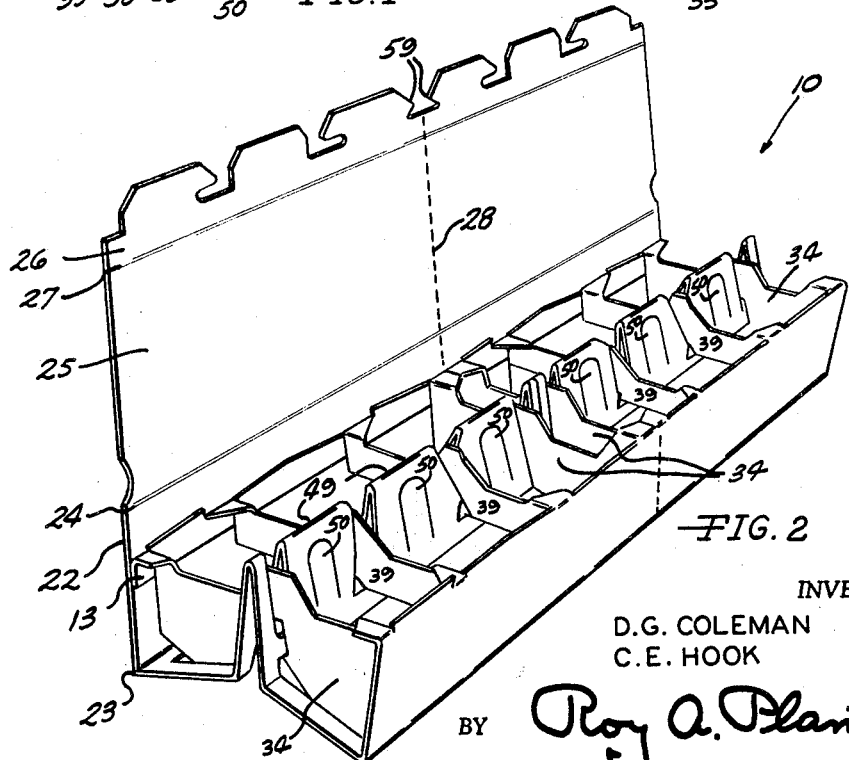
FIGURE 2 shows in perspective the improved egg carton of the present invention in set-up form ready for filling with eggs.

Referring to FIGURE 2 of the drawings, it will be noted that the egg carton 10, which is the subject of the present invention, is shown in perspective so as to indicate the general arrangement of the parts of same, which will be more specifically described hereinafter, as they appear in set-up or assembled form. This egg carton is formed from a generally rectangular carton blank 11, FIGURE 3, which is prefolded and glued as shown in FIGURES 1 and 4 to form the prepared egg carton set-up blank 12 which can be handled by an egg carton set-up machine such as that of U.S. Patent 3,205,793, in conventional manner, to form the set-up egg carton shown in FIGURE 2.

Figure 3:
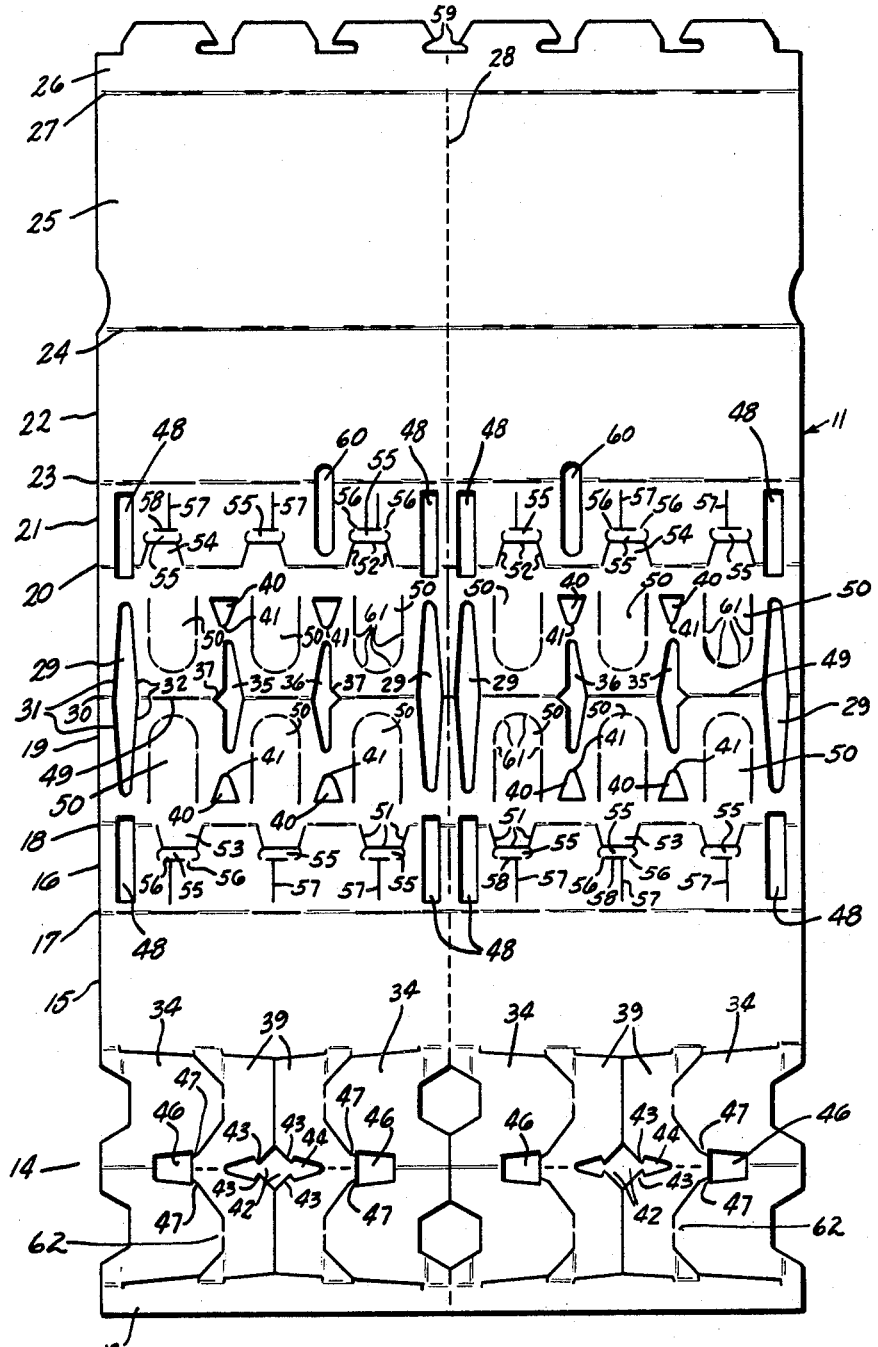
FIGURE 3 shows the blank of the egg carton of the present invention before folding and gluing as shown in FIGURE 1.

The egg carton blank 11 is divided into a multiplicity of areas by transverse fold lines and cut lines. Starting at the bottom of the blank as shown in FIGURE 3, there is a narrow attaching flange 13, and then a transverse partition forming area 14 which is followed by a partial upstanding wall member 15. This wall member 15 is separated from an adjacent bottom member 16 by a combined fold and cut line 17. A combined fold and cut line 18 separates the bottom member 16 from an adjacent longitudinal partition forming area 19 which, in turn, is separated from bottom member 21 by a combined fold and cut line 20. A full upstanding wall member 22 is disposed next to bottom member 21 and is separated therefrom by a combined fold and cut line 23, and has an opposite edge thereof defined by fold line 24. A cover panel 25 is disposed next to the wall member 22 and is separated from a hook carrying partial wall member 26 and attached thereto along fold line 27.

Referring again to FIGURE 3, it will be noted that the blank 11 is generally symmetrical about a longitudinal centerline 28, which is partially perforated and partially cut, and the longitudinal partition forming area or ridge area 19 has elongated cut-outs 29 at each end of same as well as along opposite sides of the longitudinal centerline 28. The purpose of the partially perforated and partially cut centerline 28 is to permit the egg-filled carton at the retail store to be broken along this centerline to provide two symmetrical half-dozen cartons. The central portion of these cut-outs 29 at the ridge fold line 30, are preferably provided with outward flaring side portions 31 and 32 which provide an enlarged inlet 33, FIGURE 1, into the upper end of cut-out 29 when the egg carton is in set-up form. This enlarged inlet 33 facilitates receiving the bottom edge of the deep cross partition 34 in the course of setting up the egg carton, for instance as set forth in U.S. Patent No. 3,205,793 of one of the present applicants.

Parallel to elongated slots or cut-outs 29, FIGURE 3, and between each pair of same, are a pair of symmetrically spaced elongated slots 35 and 36, the central portion of each of which has an outward flaring portion 37 on one side of same but at opposite sides of said slots 35 and 36, with said side having said flaring portion 37 being relatively straight while the other side gradually tapers outward so that the elongated slots 35 and 36 are widest at the ridge fold line 30, FIGURES 3 and 7, thus providing a wide inlet 38, FIGURE 1, to facilitate entry of the shallow, broken bottom, cross partitions 39 into said slots, FIGURES 2 and 5, as will be hereinafter described.

Elongated slots 35 and 36 are preferably smooth sided and spaced from the lower end of same, when the carton is in set-up form, FIGURE 7, there is a substantially triangular opening 40 with the upper point end 41 of same being substantially centered on the substantially straight vertical side of the corresponding elongated slot 35 or 36 and which side carries outward flaring portion 37. By arranging slots 35 and 36 in this position relative to upper point 41 of opening 40 it facilitates holding the shallow cross partitions 39 in position perpendicular to the set-up carton bottom. The shallow cross partitions 39 have their bottom edge provided with a center notch or throat 42, FIGURE 3, with hooks 43 at the top of same and an opening 44 above said hooks 43 so as to facilitate hooking into triangular opening 40 as shown in FIGURE 7. The deep cross partitions 34 which are at the outer ends of the carton and also on opposite sides of longitudinal centerline 28, FIGURE 2, have a notched bottom center portion 46 with inturned hooks 47, which in the set-up carton, FIGURES 2 and 6, engage the upper or ridge end of bottom openings 48 to lock the deep cross partitions in fixed position in the set-up carton.

By providing slits 49 in the top of the ridge 30, FIGURES 3 and 5, the inverted V-ridge will form during setting up substantially straight, non-bulged, side portions or closely spaced side members thus providing a wider egg receiving compartment to better pocket extra large eggs. Said longitudinal partition or inverted V-shaped ridge forming member 19 is also provided with tongue members 50, hinged at their lower end but with their tops offset in the range of one-sixteenths to three-sixteenths of an inch vertically from each other on opposite sides of the inverted V-shaped ridge forming member 19 to facilitate setting up the egg carton, FIGURE 2, without the tongue members hooking onto each other and interfering with machine setting up of the egg carton. The top end of tongues 50 are generally arcuate and preferably semicircular and extend to a point approximately three-eighths to three-sixteenths of an inch from the top of said inverted V-shaped ridge center parition. With the tongue members 50 and opening from which they are cut forming what is referred to as the egg carton cathedral it is to be noted that the edges of the tongue openings will be in position to contact the side of the egg resting against the tongue 50 which is of a width in the range of eleven-sixteenths to thirteen-sixteenths of an inch and preferably three-fourths of an inch wide while the tongues 50 on opposite sides of the ridge forming member 19 and of directly opposite egg holding compartments can fold back flat toward each other so as to provide maximum width egg compartments with only two back-to-back thicknesses of paperboard between the eggs in directly opposite compartments to separate and protectively cushion them from each other while supplying more space for the eggs.

To help hold the tongue members 50 flat during printing and while being fed to the set-up position we prefer to provide them with very narrow and easily broken nicks 61, and likewise we prefer to use the same kind of very narrow and easily broken nicks 62 to hold cross partitions 39 and 34 in place during feeding of the carton blank and previous printing or handling of same to reduce damage to the carton blank.

Where extra large or jumbo size eggs are to be packed, the egg cartons have to have larger egg receiving compartments than those used for medium and large eggs so that each egg compartment of the egg carton can receive and hold one of these larger eggs with a minimum of egg breakage from the time they are packed until the ultimate consumer uses them. Egg cartons are highly competitively priced on the market and accordingly being able to produce the egg cartons to handle eggs satisfactorily with a minimum of breakage, and with even a little less paperboard may make the difference between a profitable product and one which is not. The present carton takes this into account in making an exceptionally egg protective egg carton with a minimum amount of paperboard. One thing which helps to solve the egg breakage problem is to provide the bottom of the carton, FIGURE 3, adajcent the two sides of the inverted V-shaped ridge with cuts 51 in one side and with cuts 52 in the other side to provide, when the egg carton is set up, FIGURES 5, 6 and 7, with supporting feet 53 and 54, respectively, extending from the adjajcent bottom edges and in the plane of the two sides of the inverted V-shaped ridge center partition 19. In addition, we have found that when the supporting feet 53 and 54 are directly opposite to each other there is a tendency for these feet to catch on each other when the carton blanks are stacked in the hopper of an egg carton set-up machine and being fed from the bottom of the stack through the egg carton set-up machine so that there is a tendency to feed more than one carton at a time with the egg carton set-up machine being only able to handle and set up one blank at a time with resultant interference of said extra carton blank and many times damage to same so that it has to be replaced free of charge by the producer with the added expense involved. One phase of the present invention is to overcome or minimize this difficulty of multiple carton feeding and this we have found is helped by offsetting sidewise feet 53 from feet 54, or instance, one-sixteenth of an inch to three-sixteenths of an inch, as illustrated in FIGURES 3 and 5. These feet provide two additional lines of support for the extra weight of the extra large or jumbo size eggs for which this particular egg carton has been developed.

We have also found in connection with developing the present egg carton that the bottom edge of feet 53 and 54, even though completely severed from the carton bottom member 16 or 21 tends to wedge or hang up during the setting up operation so as to bend to a limited amount out of the flat plane of the side members of the inverted V-shaped ridge portion 19 and stay bent out, thus reducing their maximum supporting capability. This difficulty we have found can be very advantageously minimized by providing hinged members 55 having substantial width nicks 56 hingedly connectng said hinged member 55 to bottom members 16 or 21, as the case may be, so that when the egg carton is being set up and the inverted V-shaped ridge member 19 is being bent away from bottom members 16 or 21, as the case may be, and the feet 53 and 54 start moving away from bottom members 16 or 21, the hinged members 55 move on their hinging nicks 56 to let the bottom edge of feet 53 and 54 freely separate from the abutitng edge of hinged members 55 so that said feet 53 and 54 do not tend to bend out of the plane of the corresponding sides of the inverted V-shaped ridge member 19.

Hinged members 55 also serve a second purpose in that the hinging nicks 56 are at the opposite sides of bottom cushioning slit 57 which terminates on the slit 58 connecting and terminating at the adjacent sides of said hinging nicks 56. With an egg in the egg receiving compartment it rests on the bottom of same and above bottom cushioning slit 57 so as to let the slit open up to a limited extent to cradle the bottom end of the egg. However, if the egg carton is dropped either alone or in a crate this slit can open up enough to permit the egg to lower to the point of hitting the floor under the egg carton, or the bottom of the crate if packed in same, with resultant danger of egg breakage and replacement costs. The nicks 56 which connect the hinged members 55 to the carton bottom 16 or 21, as the case may be, at opposite sides of said bottom cushioning slit 57 resist the excessive opening of said slit while permitting limited egg bottom cushoning, thus cradling the egg while preventing its being broken by sagging so low in the egg compartment as to hit the floor or bottom of the egg crate in which the egg carton is packed along with others on top of same.

Referring to FIGURE 6, it will be noted that an exceptionally stable egg carton construction is involved since the deep cross partitions 34 have their bottom edge 58 in the plane of the carton bottom where they give crosswise support which supplements the front and back bottom edges of the carton as well as the two rows of center feet 53 and 54. Also, when the cartons are stacked it will be noted that the cover panel 25 is supported at its front and back edges on the front and back wall portions of the carton while the top of the inverted V-shaped ridge 19 supports the center of the cover panel 25 to provide a firm foundation for supporting a like carton stacked on same when placed in an egg crate or wire carrier used to transport filled egg cartons to a point of sale such as a local grocery store. This stable construction thus helps to eliminate breakage of eggs in the egg carton in which they are packed. The cushioning of the eggs on the above described specially formed carton bottom, and the tongue shaped cathedral in the inverted V-shaped longitudinal center partition forming member 19 further cooperates in providing the very best egg carton devised for handling extra large eggs. It is also to be noted that the small center hooks 59 on the hook carry-in wall member 26, FIGURES 2 and 3, help stabilize the carton against twisting when picked up by its end and thus further stabilize the carton and reduce strains on the eggs in the filled egg carton egg receiving compartments. Openings 60, FIGURES 3 and 5, are used to facilitate the setting up of these egg cartons by egg carton set-up machines utilizing fingers to push the sides of the pre-glued and formed blank, FIGURES 1 and 4, apart ready for forming the carton bottom and latching the cross partitions in place.

It will thus be readily apparent that novel and advantageous provision has been made for carrying out the desired ends set forth in this invention which is a variation from and generally an improvement on the construction set forth in our co-pending patent application Serial No. 460,378 hereinbefore referred to. However, attention is directed to the fact that variations may be made in the egg carton constructions disclosed herein without departing from the spirit and scope of the invention as above described and illustrated in the drawings. Also, directional terms such as "front," "back," "top," "bottom," "upper," "lower," et cetera, have been used to facilitate explaining the invention in the positions of the egg carton and blank as shown in the drawings and are not to be considered as limiting the invention.

Other modes of applying the principle of our invention may be employed instead of the one explained, change being made as regards the carton and details herein disclosed, provided the features stated in any of the following claims or the equivalent of such stated features be employed.

We therefore particularly point out and distinctly claim as our invention:

1. A paperboard egg carton having an inverted V-shaped center ridge partition with deep end cross partitions and shallow intermediate cross partitions which in the set-up carton with its top- bottom, and sides form a series of substantially uniform size egg receiving compartments, said carton having cathedrals on the side panels forming said inverted V-shaped center ridge partition with one cathedral to each egg receiving compartment and approximately centered on the side of same, wherein said cathedrals are of a width approximately in the range of eleven-sixteenths to thirteen-sixteenths of an inch and are of the bottom hinged tongue type with severed sides and top, the upper ends of the cathedrals of directly opposite side egg receiving compartments being vertically offset relative to each other and with the upper end of each being substantially arcuate and extending to a point in the range of approximately three-eighths to three-sixteenths of an inch from the top of said inverted V-shaped ridge center partition.

2. A paperboard egg carton as set forth in claim 1, wherein said inverted V-shaped center partition of the carton, when set up, has a row of bottom supporting feet on the bottom of each of the sides of said center partition with each row of supporting feet being offset moderately sidewise from those directly opposite in the other row of said supporting feet, with all of said feet being cut from the bottom of said carton.

3. A paperboard egg carton as set forth in claim 2, wherein the bottom of said egg carton blank has at the bottom of each of said feet, hinged members completely severed from the bottom of said feet, with said hinged members having on their side directly opposite to that in contact with the bottom of said feet a pair of spaced apart substantial nicks which form the hinges of said hinged members, said carton bottom portion also having egg cushioning slits extending from a point between said nicks of each of said hinged members outward substantially to the adjacent side panel of said egg carton.

4. An egg carton having spaced wall members, bottom members, an inverted V-shaped ridge center partition open from the bottom to the top thereof and forming a longitudinal partition connecting together said bottom members with the bottom of said carton being elevated in its longitudinal center partition edge joining portion, transverse partitions cooperating with said longitudinal partition to separate the interior of the egg carton into a multiplicity of egg receiving pockets, and a cover member normally closing said egg carton, wherein said transverse partitions which are at the opposite ends of said egg carton extend substantially to the plane of the bottom of said egg carton and have an upwardly extending deep notch in the bottom center portion of same, said inverted V-shaped ridge center partition having a deep notch in its top to receipe and fit the deep notched bottom portion of said transverse end partition, said bottom panels of said carton and the lower portion of the adjacent side of said inverted V-shaped ridge center partition being slotted to permit the bottom portion of said transverse end partition to extend therethrough, an inwardly extending alined pair of hooks in the opposite sides of said deep notch of said transverse end partitions, said hooks engaging the end of said carton bottom slot which terminates in the lower portion of said inverted V-shaped ridge center partition, to hold said transverse end partitions firmly in place, a pair of shallow transverse partitions with notched bottoms having inturned hooks, said shallow partitions being substantially equally spaced from each other and said end partitions, and notch including means in said inverted V-shaped ridge center partition for receiving said hooks and holding said shallow partitions in upright position, said egg carton also including an egg cushioning cathedral means in the form of tongue members, said tongue members being wholly located in and cut from said inverted V-shaped ridge center partition side of each egg receiving compartment and substantially centered lengthwise of same, each of said tongue members being hinged on said V-shaped ridge center partition near the bottom and crosswise of said compartment and having a rounded top so that the sides and top of the tongue cut lines will form a pocket for the egg when the latter is resting against said tongue in position for cushioning said egg while said tongue itself will retract into the open space within said inverted V-shaped ridge to take advantage of this space in providing extra room for the side of the egg.

5. An egg carton as set forth in claim 4, wherein said tongue members are of a width approximately in the range of eleven-sixteenths to thirteen-sixteenths of an inch and with the upper end of same substantially arcuate and extending to a point in the range of approximately three-eighths to three-sixteenths of an inch from the top of said inverted V-shaped ridge center partition.

6. An egg carton as set forth in claim 4, wherein said tongue members directly opposite to each other in said inverted V-shaped ridge center partition are offset vertically relative to each other in the range of one-sixteenth to three-sixteenths of an inch.

7. An egg carton as set forth in claim 6, wherein said tongue members are of a width approximately in the range of eleven-sixteenths to thirteen-sixteenths of an inch and with the upper end of same substantially arcuate and extending to a point approximately three-eights to three-sixteenths of an inch from the top of said inverted V-shaped ridge center partition.

8. An egg carton as set forth in claim 4, wherein said tongue members are of a width of approximately three-fourths of an inch and have a semicircular upper end terminating in the range of approximately three-eights to three-sixteenths of an inch from the top of said inverted V-shaped ridge center partition, and wherein the tops of said tongue members on one side of said inverted V-shaped ridge center partition are approximately one-eighth of an inch nearer the top of said ridge than on the other side, said tongues all being approximately one and one-quarter inch long.

9. An egg carton as set forth in claim 4, wherein said carton has two rows of feet on its underside, said feet being cut from the bottom panels and in the set-up carton lying substantially in the planes of the opposite side walls of said inverted V-shaped ridge center partition, the bottom edge of said feet in the carton blank before same is set up abutting but freely severed from the adjacent edge of hinged members in the bottom panels of said carton, the hinges of said hinged members being in the form of a pair of spaced apart nicks at the opposite side of said hinged members from the side in contact with the bottom of said feet, whereby in the setting up of said egg carton these hinged members will hingedly move to free the bottom of said feet and facilitate setting up said carton without distorting and bending said feet, whereby when the carton is fully set up they will not be out of the plane of said side walls and thus in better condition for supporting the center portion of the set-up egg carton.

10. An egg carton as set forth in claim 9, wherein said feet extending from the bottom side edges of said inverted V-shaped ridge center partition in two rows are so arranged that those connected to one side of said ridge partition are offset sidewise from those in corresponding position on the bottom edge of the other side of said center ridge partition.

11. An egg carton as set forth in claim 9, wherein in the bottom of said carton perpendicular to the side edges of same and substantially centered in each egg receiving compartment is a slit extending outward from said hinged members between said nicks so that when there is an egg in the corresponding compartment the weight of the egg will slightly open said slit to cushion the egg on said bottom while said nicks hold said slit from opening up enough to allow the egg to settle dangerously far where it would be more easily broken if the carton were dropped on its bottom.

12. An egg carton as set forth in claim 11, wherein there is a tongue member in the inverted V-shaped ridge center partition for each egg compartment of said egg carton which is of a width approximately in the range of eleven-sixteenths to thirteen-sixteenths of an inch with the upper end of same substantially arcuate and extending to a point approximately three-eights to three-sixteenths of an inch from the top of said inverted V-shaped ridge center partition.

13. An egg carton as set forth in claim 11, wherein there is a tongue member in the inverted V-shaped ridge center partition for each egg compartment of said egg carton with said tongue members directly opposite to each other in said inverted V-shaped ridge center partition offset vertically relative to each other in the range of one-sixteenth to three-sixteenths of an inch.

14. An egg carton as set forth in claim 11, wherein said feet extending from the bottom side edges of said inverted V-shaped ridge center partition in two rows are so arranged that those connected to one side of said ridge partition are offset sidewise from those in corresponding position on the bottom edge of the other side of said center ridge partition.

15. A paperboard egg carton having an inverted V-shaped center ridge partition with deep end cross partitions and shallow intermediate cross partitions which in the set up carton with its top, bottom and sides form a series of substantially uniform size egg receiving compartments, said carton having cathedrals in the compartment side panels which form said inverted V-shaped center ridge partition with one cathedral to each egg receiving compartment, said cathedrals being approximately centered on the side of same, wherein said inverted V-shaped center partition of the carton when set up has a row of bottom supporting feet on the bottom of each of the sides of said center partition, with all of said feet being cut from the bottom of said carton, hinged members in the bottom of said carton completely severed from the bottom of said feet, with said hinged members having on the side of each directly opposite to that in contact with the bottom of said feet, a pair of spaced apart substantial nicks which form the hinges of said hinged members, whereby in setting up said egg carton these hinged members will hingedly move to free the bottom of said feet and facilitate setting up said carton without distorting and bending said feet.

16. A paperboard egg carton as set forth in claim 15, wherein said carton bottom also has egg cushioning slits extending from a point between said nicks of each of said hinged members outward a major portion of the distance from said hinged members to the adjacent side panel of said egg carton.

17. An egg carton as set forth in claim 15, wherein said cathedrals are of a width approximately in the range of eleven-sixteenths to thirteen-sixteenths of an inch and are of the bottom hinged tongue type with severed sides and tops and with the upper end of each of said tongue-shaped cathedrals being substantially arcuate and extending to a point in the range of approximately three-eights to three-sixteenths of an inch from the top of said inverted V-shaped ridge center partition.

18. A paperboard egg carton having an inverted V-shaped center ridge partition with deep end cross partitions and shallow intermediate cross partitions which in the set up carton with its top, bottom and sides form a series of substantially uniform size egg receiving compartments, said carton having cathedrals in the compartment side panels forming said inverted V-shaped center ridge partition with one cathedral to each egg receiving compartment and approximately centered on the side of same, wherein said cathedrals are of a width approximately in the range of eleven-sixteenths to thirteen-sixteenths of an inch and are of the bottom hinged tongue type with severed sides and tops and with the upper end of each of said tongue-shaped cathedrals being substantially arcuate and extending to a point in the range of approximately three-eighths to three-sixteenths of an inch from the top of said inverted V-shaped ridge center partition.

References Cited

UNITED STATES PATENTS

| 2,091,960 | 9/1937 | Brundin | 229—29 |
| 2,113,459 | 4/1938 | Brundin | 229—29 |
| 3,034,696 | 5/1962 | Swanson | 229—28 |
| 3,152,747 | 10/1964 | Cummins | 229—28 |
| 3,185,380 | 5/1965 | Reifers et al. | 229—28 |
| 3,205,793 | 9/1965 | Coleman | 93—37 |
| 3,246,827 | 4/1966 | Walter | 229—29 |
| 3,251,531 | 5/1966 | Hook et al. | 229—28 |
| 3,334,801 | 8/1967 | Henderson | 229—28 |

FOREIGN PATENTS 396,755  1/1966  Switzerland.

DAVIS T. MOORHEAD, *Primary Examiner.*